Oct. 11, 1938.   D'A. A. YOUNG, JR   2,132,670
MOUNT FOR TRANSPARENCIES
Filed April 29, 1936
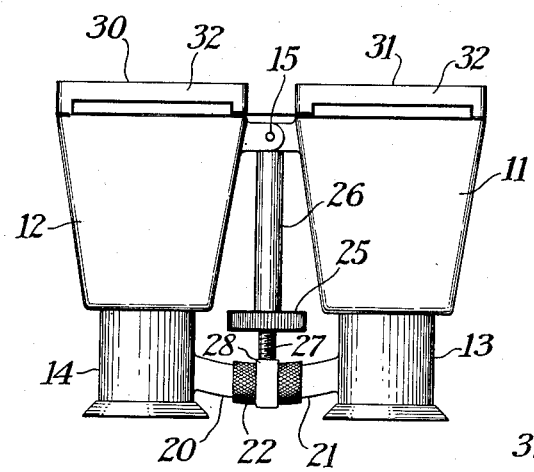
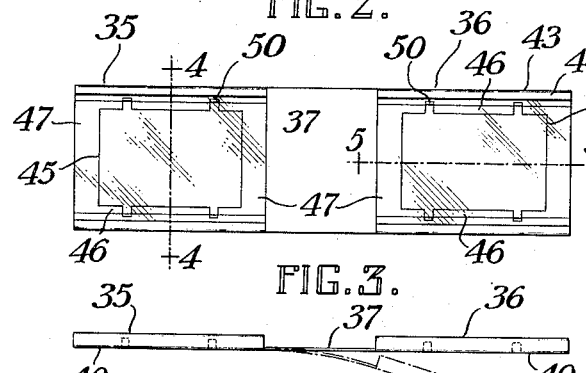
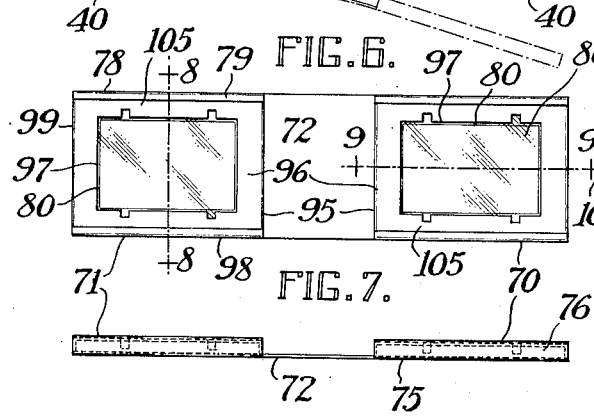
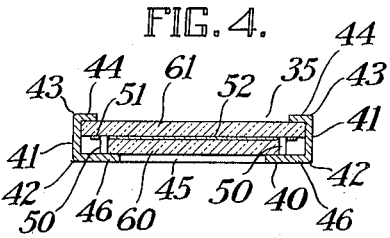
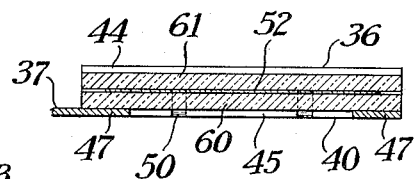
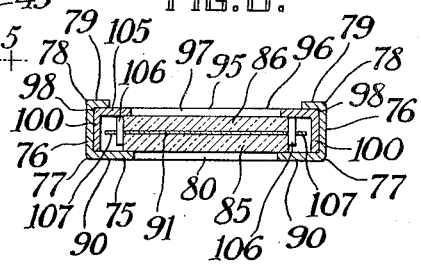
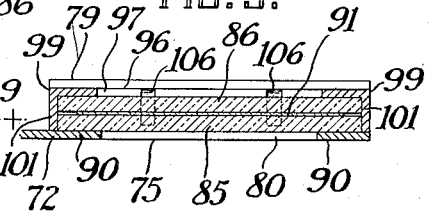
D'Arcy A. Young, Jr.
INVENTOR.
BY *Newton M. Perries*
*Ronald H. Stewart*
ATTORNEYS Patented Oct. 11, 1938

2,132,670

UNITED STATES PATENT OFFICE 2,132,670

MOUNT FOR TRANSPARENCIES

D'Arcy A. Young, Jr., Rochester, N. Y., assignor, by mesne assignments, to Eastman Kodak Company, Jersey City, N. J., a corporation of New Jersey Application April 29, 1936, Serial No. 76,965

6 Claims. (Cl. 88—29)

This invention relates to film holders adapted to hold a film area flat for viewing or projecting and particularly adapted to position stereo-films so that they can be viewed in a stereoscope.

One object of the invention is to provide a mount which may be readily and easily adjusted to conform with adjustments of the viewing device. Another object is to provide a mount of this type having film holders which are connected by a flexible strip so that the holders may be moved, upon adjustment of the viewing device, so that the center lines of the viewing device will always be normal to films positioned in the holders. A further object is to provide a mount of this class which is simple in construction, inexpensive to manufacture, and effective in use. A still further object is to provide a mount which is made substantially from a single piece of sheet material so as to form a unitary member which can easily and quickly be secured to or removed from a viewing device, yet which securely but resiliently positions and holds the films in viewing position. Still another object is the provision of a mount of the class described in which the film is maintained in a flat or substantially uniplanar position that the center line or lines of the viewing device will always be normal to the picture areas of the films positioned in the mount.

To these and other ends the invention resides in certain improvements and combinations of parts, all as will be hereinafter more fully described, the novel features being pointed out in the claims at the end of the specification.

In the drawing:

Fig. 1 shows a stereo-viewing device, in diagrammatic form, including a mount for transparencies constructed in accordance with a preferred embodiment of the invention.

Fig. 2 is a plan view of the preferred form of mount for transparencies.

Fig. 3 is a side elevation of the mount illustrated in Fig. 2.

Fig. 4 is a transverse vertical sectional view taken substantially in the line 4—4 of Fig. 2 showing the detail construction of one of the film holders.

Fig. 5 is a longitudinal vertical sectional view taken substantially on the line 5—5 of Fig. 2 showing the relation of one of the spaced film holders and the connecting flexible strip.

Fig. 6 is a view similar to Fig. 2 showing a modified form of mount for transparencies.

Fig. 7 is a side elevational view of the mount illustrated in Fig. 7.

Fig. 8 is a transverse vertical sectional view taken substantially on the line 8—8 of Fig. 6 showing the detail construction of the modified film holder.

Fig. 9 is a longitudinal vertical sectional view taken substantially in the line 9—9 of Fig. 6 showing the relation of the modified form of film holders and the intermediate flexible strip.

The same reference numerals throughout the several views indicate the same parts.

The present invention relates to a holder or mount by which picture areas of a film may be held flat for viewing. It includes broadly a film holder in which there are two film supporting members mounted on a base permitting angular movement of one film holder with respect to the other.

It is common practice to provide binocular stereoviewing devices which may comprise, in general, suitable optical members or tubes to the objective ends of which mounts for transparencies are detachably secured. The mounts embodied in the present invention are preferably in the form of two spaced film holders arranged in alignment with the binoculars, and a flexible base which connects the holders. This flexible base enables the holders to vary their angular relation, upon adjustment of the viewing device, so that the center lines of the binocular are always normal to the picture areas of the films positioned in the holders. The term film is herein used in its generic sense to include films, plates, or any other transparent material having an image thereon.

Referring now to the drawing and more particularly to Fig. 1, there is shown a pair of binoculars having spaced optical tubes 11 and 12, of suitable construction, to which are secured the usual eye pieces 13 and 14. The tubes 11 and 12 are preferably pivotally connected together at 15, in any suitable manner, to enable the eye pieces 13 and 14 to be moved laterally to suit the eye spacing of the observer. To secure this lateral adjustment, the tubes 11 and 12, have adjacent the eye pieces, short arcuate shaped threaded studs 20 and 21 connected by a similarly shaped hollow threaded sleeve 22 into which the studs extend, as clearly illustrated in Fig. 1. The arrangement of the threads on the studs 20 and 21 and the sleeve 22 is such that when the sleeve 22 is rotated, the eye pieces 13 and 14 will be moved laterally to adjust the distance therebetween. It is apparent that when the eye pieces are thus moved, the angular relation between the center lines of the tubes 11 and 12 is varied. The eye pieces are focused in the usual way by operating a small wheel 25 rotatably mounted on one end of a tubular member 26, the other end of which is suitably secured to the pivot 15. The wheel 25 is formed with centrally threaded opening (not shown) adapted to engage a correspondingly threaded member 27, one end of which is attached at 28 to the sleeve 22, and the other end telescoping within the tubular member 26, in the usual and well known manner. As thus far described the viewing device may be of well known construction.

Coming now to my invention, a film holder or mount for transparencies is removably secured to the objective ends 30 and 31 of the binocular tubes 11 and 12, as by flanges 32 which form a track for the edges of the mount. This mount is stamped or otherwise constructed, in the preferred embodiment, from a single piece of resilient or flexible material, preferably metal, and formed to provide spaced film holders, generally indicated by the numerals 35 and 36, and an intermediate flexible strip 37 connecting the holders 35 and 36, as clearly illustrated in Figs. 2, 3 and 5.

Each of the film holders 35 and 36 comprise a bottom 40, in alignment with and preferably forming a part of the flexible strip 37, and opposite sides 41 formed by bending the sheet material along the parallel lines 42. These sides are also preferably folded or bent along the lines 43 to form inturned flanges 44 adjacent the upper edges of the sides, and spaced from the bottoms 40, as clearly illustrated in Fig. 4. The sides are preferably omitted on the strip 37. A viewing aperture 45 is formed in each of the bottoms 40, and is so positioned as to be in alignment with one of the tubes 11 and 12 of the binoculars. The aperture 45 is preferably made smaller than the bottom 40 so as to provide narrow marginal bottom portions 46 and 47 adjacent the aperture 45, see Figs. 2 and 4.

The marginal portions 46 adjacent the sides 41 have parts thereof struck up to form upstanding positioning lugs 50 arranged to project through the marginal perforations 51 of a strip of film 52 positioned within the holder. These lugs 50 thus engage the film 52 and position it in registry with the aperture 45. As the portions 46 and 47 constitute a part of the bottom 40, the lugs 50 may be broadly considered as being struck up from the bottom of the film holder. The term bottom and sides are, however, relative depending on the position of the mount, so for this reason the bottom and sides may all be broadly considered as sides.

To secure the best results, it is desirable to maintain the film 52 in a flat or uniplanar position. All films, however, have a tendency to curl. In order to overcome this tendency, the present invention presents means for securely clamping or holding the film in such a flat position. This clamping means preferably comprises sheets of substantially rigid transparent material such, for example, as glass, between which sheets the film is positioned by the lugs 50, as clearly shown in Fig. 4. In the present embodiment, the clamping or holding means comprises a lower glass strip or sheet 60 and an upper glass strip or sheet 61. The lower sheet 60 is positioned beneath the film 52 and is supported by the marginal portions 46 and 47 of bottom 40.

The width of the strip 60 is preferably substantially equal to the distance between the lugs 50, see Fig. 4, so that these lugs thus limit the movement of the lower strip in the direction transverse to the major axis of the mount. The upper strip 61 is positioned above the film 52 and is supported by but extends beyond the lugs 50, and engages the sides 41 so that the latter limit the movement of this upper glass in the direction of the minor axis of the mount. The strips 60 and 61 thus provide a holding means or clamp which maintains the film 52 in a flat position. The lugs 50 are of such length as to just project through the film 52 so as not to prevent the upper strip 61 from engaging the film.

The height of the sides 41 are preferably slightly less than the combined thickness of the two glass strips 60 and 61 and the film 52 so that the flange 44 will engage the upper surface of the strip 61 to hold the latter in pressing engagement with the film 52.

As the material from which the mount is made is of a resilient or flexible nature, the flanges 44 are slightly resilient and thus exert a yielding pressure on the upper strip 61 to resiliently hold the film in position. The flanges 44 thus not only cooperate with the strips 60 and 61 to hold the film 52 in position, but also assists the strips and the lugs 50 to position the film 52 in position. To this end, the strips 60 and 61 and the flanges 44, as well as the lugs 50, may be broadly considered as positioning means for the film 52. While the lugs 50 and the sides 41 limit the movement of the strips 60 and 61, respectively, in the direction of the minor axis of the mount, the resilient pressure exerted by the flanges 44 limit the accidental movement of the strips in the direction of the major axis of the mount. Although these flanges thus securely hold the glass strips, they permit their easy and ready removal when desired.

It is apparent from an inspection of Fig. 1, and as pointed out above, that when the eye pieces 13 and 14 are adjusted laterally, the angle between the center lines of the tubes 11 and 12 is also varied. In order to secure the best results in a device of this class, it is highly important that these center lines be always normal to the picture areas of the films 52 for all adjustments of the eye pieces 13 and 14.

This necessary and important feature is secured, in the present invention, by the use of the connecting strip 37 which is of a flexible nature so that when the tubes 13 and 14 are moved about the pivot 15, the film holders 35 and 36 are free to move therewith. This flexible connecting strip thus enables the film holders to be moved relative to each other so as to vary the angle between the center lines normal to the films 52. To this end, both of the holders are in the same relation to the eye pieces 13 and 14 for all lateral adjustments of the latter.

In assembling the mount, the lower glass strips 60 are placed on the bottoms 40 and in engagement with the lugs 50. The films 52 are now placed on the strips 60 so that the lugs 50 project through the marginal perforations 51 of the film 52. The upper glasses 61 are then slid in under the flexible flanges 44, the latter resiliently gripping the strip 61 to resiliently hold all the members in assembled position. The strips 60 and 61 may be of any desired length but are preferably of a length substantially equal to that of the sides 41, as clearly shown in Fig. 5.

Referring now to Figs. 6 to 9, there is shown a modified type of mount. This mount is also stamped or otherwise formed from a piece of resilient or flexible material, preferably metal, to provide space film holders, generally indicated at 75

70 and 71, and an intermediate flexible connecting strip 72, as clearly shown in Figs. 6 and 7.

Each of the holders 70 and 71 comprises a bottom 75, and sides 76 formed by bending or folding the strip along the parallel line 77. The upper portions of the sides 76 are preferably bent along the parallel lines 78 to form inturned flanges 79 which are spaced from the bottom 75. The bottom 75 is formed with a clearance aperture 80, preferably smaller than the bottom 75, as clearly shown in Fig. 6. Each of the apertures 80 is positioned that when the mount is secured to the tubes 11 and 12, the aperture will be in alignment with the axis of one of the tubes of the binoculars. As stated above, the term bottom and sides are relative terms, depending on the position of the mount. For this reason the bottoms 75 and the sides 76 may be all broadly considered as sides of a rectangular member.

As films have a tendency to curl, it is important, especially in a device of this type, to provide means to maintain the film in a flat or uniplanar position for viewing through the eye pieces 13 and 14. To this end, the present embodiment provides two strips of substantially rigid transparent sheet material such, for example, as sheets of glass 85 and 86. These sheets differ from the sheets 60 and 61 in that they are of equal width, but neither of them engages the sides 76, as clearly shown in Fig. 8. The lower strip 85 is positioned on and supported by marginal portions 90 of the bottom 75 adjacent the viewing aperture 80. The upper glass 86, on the other hand, overlies and is supported by a film strip 91. The strips 85 and 86 thus clamp the film 91 therebetween to securely hold the latter in flat position.

In order to maintain the glass strips and the film in position within the film holders, the present embodiment provides a suitable cover plate, indicated generally by the numeral 95 and formed from a single piece of sheet material, preferably metal. Each of these cover plates has a flat top 96 formed with a central marking aperture 97 of slightly larger size than, but adapted to register with, the clearance aperture 80 in the bottom 75. The sheet forming the cover plate is bent along the marginal lines 98 and 99 to form depending sides 100 and ends 101. These sides and ends are preferably of a height substantially equal to the distance between the flanges 79 and the bottoms 75, so that when the cover plate is slid into the film holder the flanges 79 engage the upper surface of the top 96 to resiliently retain the cover plate in position.

The cover plate 95 thus provides a shallow container for the glass strips 85 and 86 and the film 91, as will be presently shown. The glass strips are of a length substantially equal to the sides 100 and when placed within the cover plate, as shown in Fig. 9, engage the ends 101 and are held thereby. The side marginal portions 105 of the top 96 have parts thereof struck up to form depending positioning lugs 106 which extend parallel to and slightly spaced from the sides 100. These lugs project through the marginal perforations 107 of the film 91 to position the latter relative to the apertures 75 and 97. In addition to positioning the film 91, the lugs 107 engage the longitudinal edges of the glass strips 85 and 86 and thus cooperate with the ends 101 to retain the glass strips in proper position within the cover plate 95, all of which is clearly illustrated in Figs. 8 and 9. The lugs 106 are preferably of a length slightly greater than the thickness of the strip 86 and the film 91 so that the lugs will also engage the lower strip 85 and thus effectively hold both glass strips in position. While only four of these positioning lugs have been shown, this is by way of illustration only, as it is contemplated that any desired number of such lugs may be used.

It is apparent from the above description, that the cover plate 95 and the flanges 79 cooperate with the lugs 106 to position and hold the film in position. The flanges and cover plate as well as the lugs may, therefore, all be broadly considered as means for positioning the film.

As pointed out above, when the eye pieces 13 and 14 of the binocular are moved laterally the angle between the center lines of the tubes 11 and 12 is varied. In order to correspondingly vary the angle between the center lines normal to the picture area of the films 91, the flexible strip 72 flexes or bends, as shown in Fig. 3, so that the picture areas are always normal to the axis of the optical tubes 11 and 12.

In assembling the modified mount, each of the cover plates 95 is held in the inverted position with the sides 100 and ends 101 extending upwardly. The upper glass strip 86 is then placed within the cover plate so that the ends thereof engage the ends 101 of the cover plate, and the edges engage the lugs 106. The film 91 is then placed over the glass strip 86 so that the lugs 106 project through the marginal perforations 107 of the film. After which the glass strip 85 is then placed over the film 91, the ends 101 of the cover plate and the lug 106 engaging the ends and sides respectively of the cover glass 85 to hold the latter in position. The assembled cover plate is then slid into the film holder beneath the overhanging flanges 79 with the lower glass 85 sliding along the bottom 75. The sides 100 of the cover plate engage the sides 76 of the film holder while the flexible flanges 79 engage the exposed face of the cover plate 95. The cover plate, with its film and clamping strips of glass, is thus resiliently held in position within the film holders, yet may be easily and quickly withdrawn when desired.

While certain embodiments of the invention have been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. A mount for transparencies comprising a film holder having a bottom and opposite sides, said bottom being formed with a viewing aperture and marginal portions adjacent said aperture, certain of said portions having parts thereof struck up to form upstanding lugs arranged to project through a strip of perforated film adjacent the opposite edges thereof, a lower strip of transparent material positioned between said film and said bottom and supported by said marginal portions, an upper strip of transparent material positioned above said film and cooperating with said lower strip to clamp said film therebetween, and resilient inturned flanges formed adjacent the upper edges of said sides, said flanges engaging said upper strip and cooperating therewith and with said lower strip and said lugs to resiliently hold and to position said film in a flat position and in registry with said aperture.

2. A mount for transparencies comprising a strip of sheet material formed to provide spaced film holders each having a bottom and opposite sides, each of said bottoms having an aperture formed therein, positioning means associated with each of said bottoms and arranged to project through a film to position it in registry with said aperture, substantially rigid transparent sheet material adjacent said positioning means to maintain said film substantially in a plane, means associated with said sides and cooperating with said sheet material and said positioning means to resiliently secure said film in position, and flexible means connecting said holders.

3. A mount for transparencies comprising, a film holder having an aperture in one side thereof, transparent sheet clamping means engaging a film within said holder to maintain said film substantially in a plane, and positioning means formed from said one side and engaging said clamping means and projecting through said film to position both said film and said clamping means.

4. A mount for transparencies comprising, a film holder having an aperture in one side thereof, transparent sheet means arranged on opposite faces of a film positioned within said holder to clamp said film to hold the latter substantially in a plane, lugs formed from said holder and arranged to engage one of said sheet means and to extend through said film to position both said film and said one sheet means, and resilient portions formed on said holder and engaging the other of said sheet means, said portions cooperating with said lugs and said sheet means to resiliently hold said film in a plane and in registry with said aperture.

5. A mount for transparencies comprising a single strip of thin sheet metal formed to provide spaced film holders and a flexible strip intermediate and connecting said holders, transparent sheet means engaging opposite faces of films positioned within said holders to hold said films in a uniplanar position, and means integral with each of said holders for positioning the films therein.

6. A mount for transparencies comprising a single strip of thin sheet metal formed to provide spaced film holders and a flexible strip intermediate and connecting said holders, transparent substantially rigid sheet means engaging opposite faces of films positioned within said holders to hold said films in a uniplanar position, upstruck lugs formed from each of said holders for positioning the film therein, and flexible flanges formed on said holders and cooperating with said lugs and said sheet means to resiliently position and hold the films in said holders.

D'ARCY A. YOUNG, Jr.